(12) United States Patent  
Chethik et al.

(10) Patent No.: US 8,774,730 B1  
(45) Date of Patent: Jul. 8, 2014

(54) FIELD PROGRAMMABLE MICROWAVE ARRAYS

(75) Inventors: Frank Chethik, Half Moon Bay, CA (US); Timothy A. Becker, Highlands Ranch, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 240 days.

(21) Appl. No.: 13/349,022

(22) Filed: Jan. 12, 2012

Related U.S. Application Data

(60) Provisional application No. 61/432,034, filed on Jan. 12, 2011.

(51) Int. Cl.  
*H04B 17/00* (2006.01)

(52) U.S. Cl.  
USPC .......................................... 455/67.15; 455/78

(58) Field of Classification Search  
USPC ................ 455/78, 67.15, 454, 560, 67.11  
See application file for complete search history.

(56) References Cited

U.S. PATENT DOCUMENTS 7,324,350 B2 1/2008 Heck et al.  
2010/0231321 A1 9/2010 Czajkowski

*Primary Examiner* — Eugene Yun  
(74) *Attorney, Agent, or Firm* — Howard IP Law Group, PC

(57) ABSTRACT

A field programmable microwave array is provided. The field programmable microwave array includes one or more RF elements interconnected by an array of switching elements. The switching elements enable the field programmable microwave array to perform one or more RF or microwave subassembly functions.

25 Claims, 14 Drawing Sheets

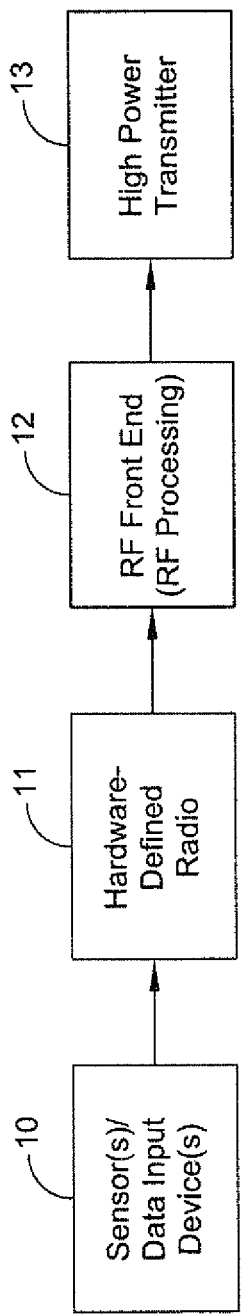
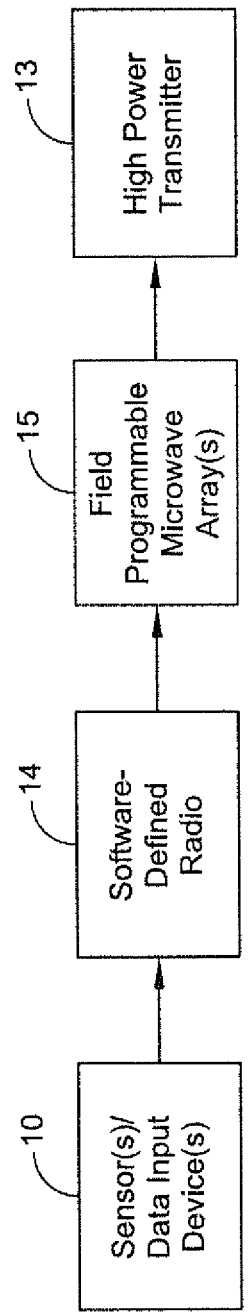
FIG. 1a (PRIOR ART)
FIG. 1b

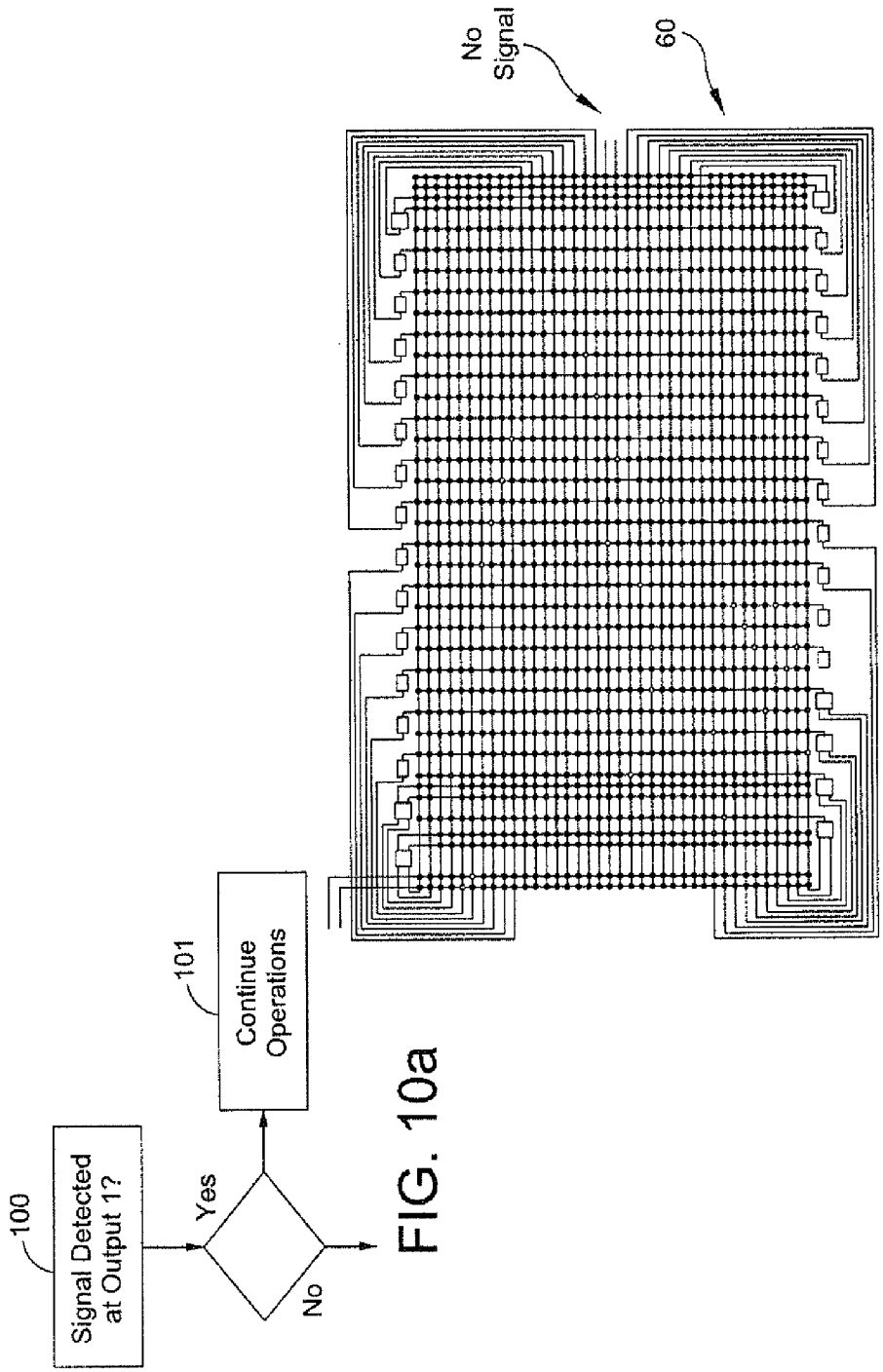

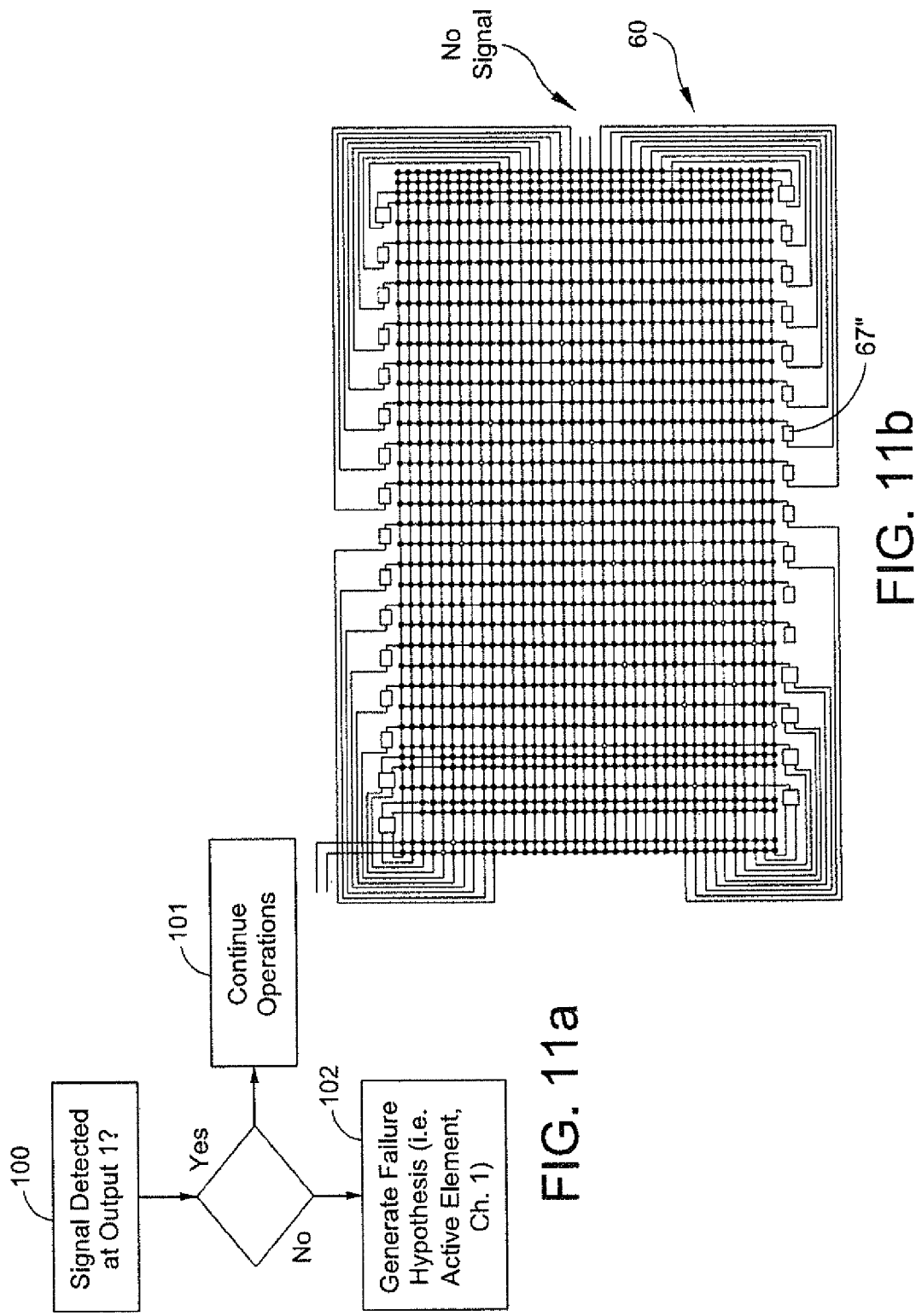

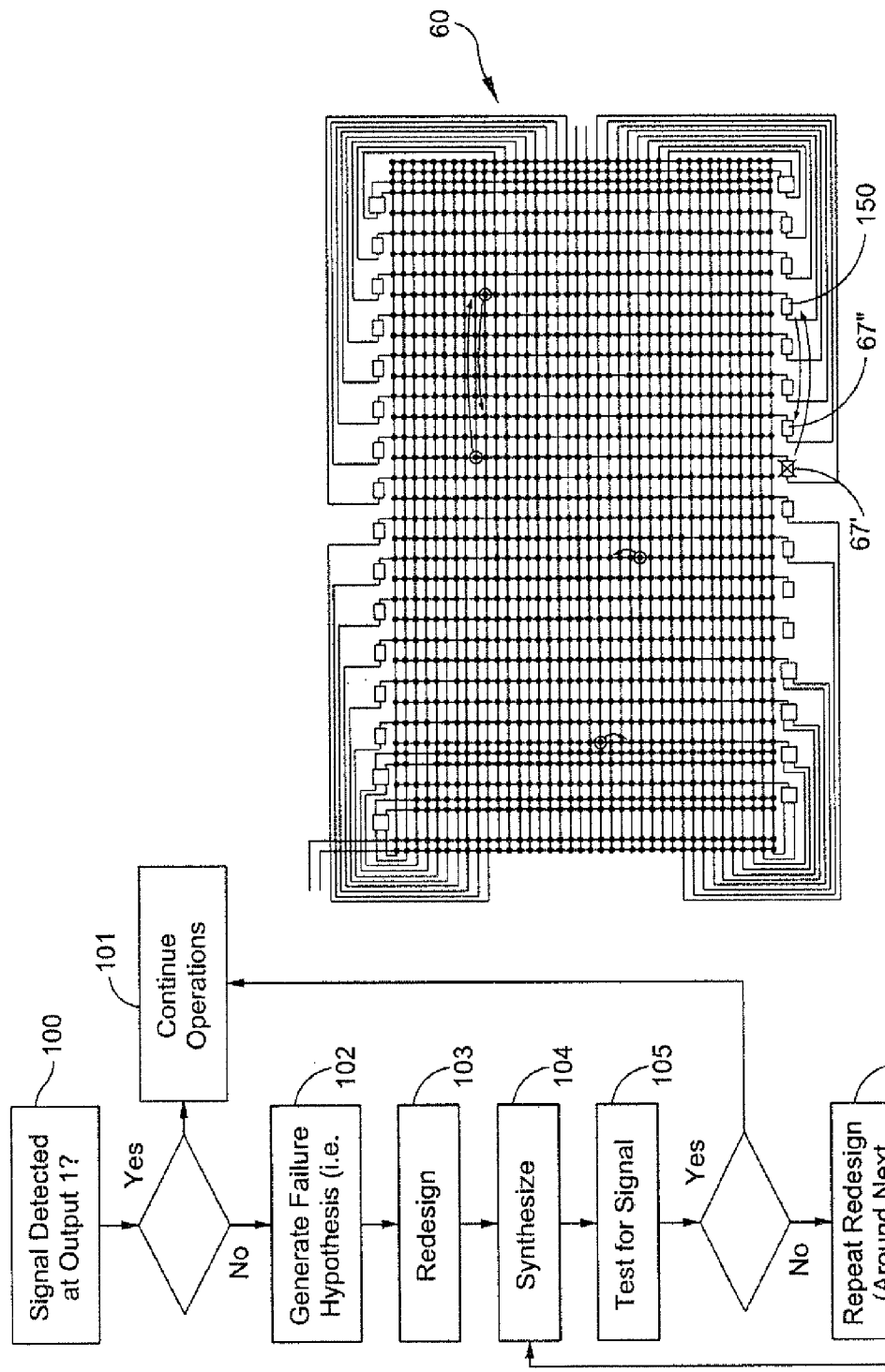

FIELD PROGRAMMABLE MICROWAVE ARRAYS

CROSS REFERENCE TO RELATED APPLICATIONS

This application claims priority under 35 U.S.C. §119(e) to Provisional Patent Application Ser. No. 61/432,034 entitled "Field Programmable Microwave Arrays" filed Jan. 12, 2011, the subject matter thereof incorporated herein by reference in its entirety.

FIELD OF THE INVENTION

The present invention relates generally to microwave and radio systems, and more particularly to field programmable microwave arrays (FPMAs).

BACKGROUND

Microwave and radio-based systems are used in countless civilian and military applications including communications, radar, and other power transmission systems. One important sub-set of applications includes their customized use in, for example, satellites, rockets, spacecraft and aircraft for providing reliable long-range communication and data transmission connections. Referring generally to FIG. 1a, these radio and/or microwave systems may include hardware-based radios 11 used to, for example, transmit data received from a data source, such as one or more sensors or data input devices 10, via a transmitter 13. A radio frequency (RF) front end module 12 may be provided for processing the data signal (e.g. filtering, mixing, up-converting) before it is transmitted to, for example, one or more ground-based receivers. In order to ensure functional reliability, the application-specific RF and microwave processing components of the front end module have traditionally been implemented with redundant spares (e.g. two transmitters) and an associated switching arrangement. This design and implementation process is costly, long in development time, and bulky in often very space-limited environments.

Alternative systems and methods for implementing microwave and/or radio systems and/or devices are desired.

SUMMARY

According to one embodiment, a field programmable microwave array (FPMA) is provided. The FPMA comprises a plurality of microwave or radio-frequency circuit elements. In one embodiment, the circuit elements are interconnected through a programmable connection matrix comprising a plurality of conductors and a plurality of switching elements for selectively routing input signals to the circuit elements and output signals from the circuit elements. The connection matrix enables the construction a large class of one or more integrated circuits from the FPMA for performing one or more logical functions.

According to another embodiment of the present invention, a method of constructing a radio-frequency or microwave device is provided. The method includes providing a plurality of circuit elements. The circuit elements are connected to a connection matrix which comprises a plurality of switches for selectively connecting the output of one or more circuit elements to the input of one or more other circuit elements. A predetermined device function may be achieved by selectively-activating one or more of the plurality of switches.

BRIEF DESCRIPTION OF THE DRAWINGS

FIG. 1a is a high level system diagram of a radio transmitter according to the prior art.

FIG. 1b is a high level system diagram of a radio transmitter according to embodiments of the present invention.

FIGS. 10a, 11a, 12a and 13a, and 10b, 11b, 12b and 13b are process flow and schematic diagrams, respectively, useful for illustrating a failure recovery process as applied to an FPMA according to an embodiment of the present invention.

DETAILED DESCRIPTION

Figure 2:
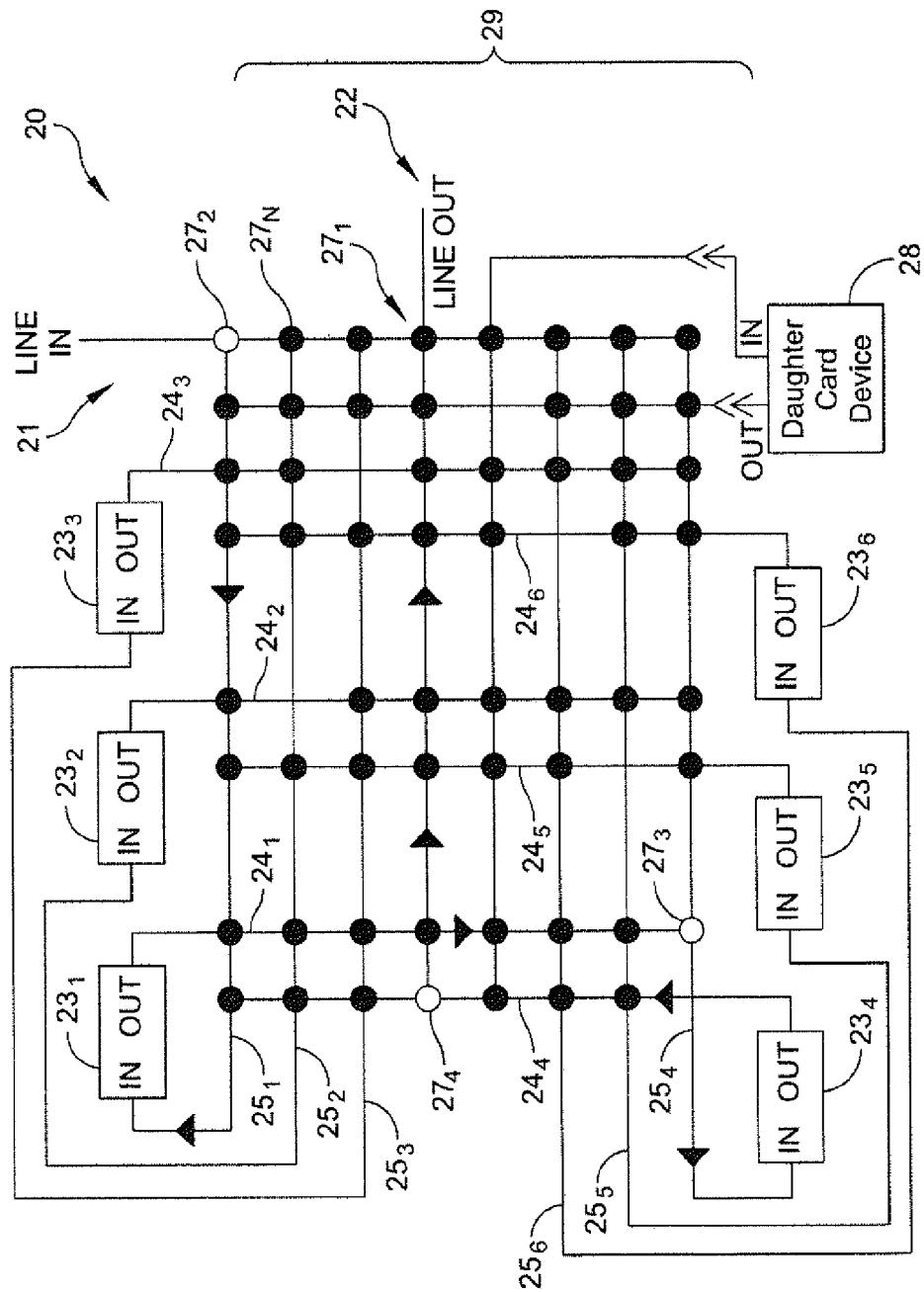
FIG. 2 is a simplified schematic diagram of an FPMA module according to an embodiment of the present invention.

It is to be understood that the figures and descriptions of the present invention have been simplified to illustrate elements that are relevant for a clear understanding of the present invention, while eliminating, for purposes of clarity, many other elements found in RF and microwave-based systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Referring generally to FIG. 1b, embodiments of the present invention include FPMA modules 15 configured to be implemented into RF and/or microwave-based systems, such as the system shown and described in FIG. 1a. By way of non-limiting example only, FPMA modules 15 according to embodiments of the present invention may be used in place of, or supplementing, traditional hardware-intensive RE front end units or components thereof as part of a software-defined radio system 14. As set forth above, this system may be used to, for example, transmit data received from a data source, such as one or more sensors or data input devices 10, via a transmitter 13.

An exemplary FPMA module comprises a plurality of RF and/or microwave circuit elements, or "primitives", commonly found in RF systems or devices (e.g. receivers and/or transmitters). Exemplary primitives include, but are not limited to, active and passive elements including RF and baseband amplifiers and oscillators, hybrid transformers, filters, mixers, phase detectors, dummy loads, Wilkinson couplers, baluns and the like. These primitives may be interconnected through a reconfigurable connection matrix. In this way, selectively connecting a combination of appropriate primitive elements may configure an FPMA module to function as, for example, an RF transmitter or receiver.

By providing duplicative (or "inactive") primitives within a given FPMA module, as well as an adaptive control or processing system, both redundancy and functional-adaptability may be built into FPMA modules according to embodiments of the present invention. For example, an externally and/or remotely programmable control or processing system may be provided for selectively controlling the connection matrix of an FPMA module. As will be set forth in greater detail below, in one embodiment, the ability to alter the connection matrix via an array of switching elements allows for a plurality of circuits to be created or constructed from a given standardized FPMA module. Thus, embodiments of FPMA modules described herein may be configured, and/or reconfigured, into more than one type of device (e.g. two or more functionally-distinct receivers may be implemented by one standardized FPMA module).

Further, by selectively reconfiguring an FPMA module, the control system may be used to implement remote troubleshooting and repair operations. In one exemplary embodiment, one or more failed active primitives of an FPMA module may be deselected and replaced by one or more redundant inactive primitives within the module by reprogramming the FPMA module. More particularly, the FPMA module's connection matrix may be altered via the switch array to bypass failed, or suspected failed, primitives and introduce functional connections to redundant primitives in an attempt to restore system functionality. In this way, the need to use entire "spare" subsystems may be eliminated with a minimum complement of FPMA modules, conserving size, weight, power and costs.

FIG. 2 illustrates the general topology of a simplified FPMA module according to embodiments of the present invention. Exemplary FPMA 20 includes input and output lines 21,22 which may be operatively connected to a plurality of primitive elements $23_1$-$23_6$ via a connection matrix 29. Connection matrix 29 comprises transverse conductors $25_1$-$25_6$ and lateral conductors $24_1$-$24_6$ associated with the inputs and outputs of primitive elements $23_1$-$23_6$, respectively. Connection matrix 29 further comprises a plurality of switches $27_1$-$27_N$ for selective control of connection matrix 29. Closing a switch 27 at an intersection of a lateral conductor 24 and a transverse conductor 25 makes an output-input connection between two primitives. This topology is based on the notion that the output of any primitive drives the input of another primitive. This arrangement may simplify the geometry of connection matrix 29 and minimize its complexity. In the exemplary configuration shown of FIG. 2, input line 21 is operatively connected in series to active primitives $23_1$ and $23_4$, and the output of primitive $23_4$ is connected to output line 22. This is achieved through the closing of switches $27_2$, $27_3$, and $27_4$ (indicated by hollow circles). In the exemplary connection matrix, switch $27_1$ comprises a system bypass. As set forth above, control of switches 27 may be achieved through the use of a separate control system that may be pre-programmed to achieve specific device functions.

Still referring to FIG. 2, it is envisioned that provisions for connecting other components and/or devices to FPMA 20 are made through I/O ports provided in connection matrix 29. Supplementing a given FPMA with additional application-specific devices may broaden its functionality. Moreover, the ability to connect external components to the FPMA aids in keeping the size of the module to a minimum. By way of non-limiting example only, frequency-specific elements may be housed in a separate sub-assembly, such as Daughter Assembly or Daughter Card 28 and operatively connected to connection matrix 29. These elements, such as filters, surface acoustic wave (SAW) devices, and/or oscillator crystals may be more reliable than many standard active primitive components, and thus, may not require the redundancy afforded by FPMA arrangements. In this way, the size of the FPMA and connection matrix may be reduced by supplying these components through external connections, rather than including them as primitives of the FPMA module itself. It should of course be understood that these "Daughter Cards" or devices connected to the FPMA may comprise any number of components for performing any functional operation, and is not limited to the exemplary embodiments described herein.

Figure 3:
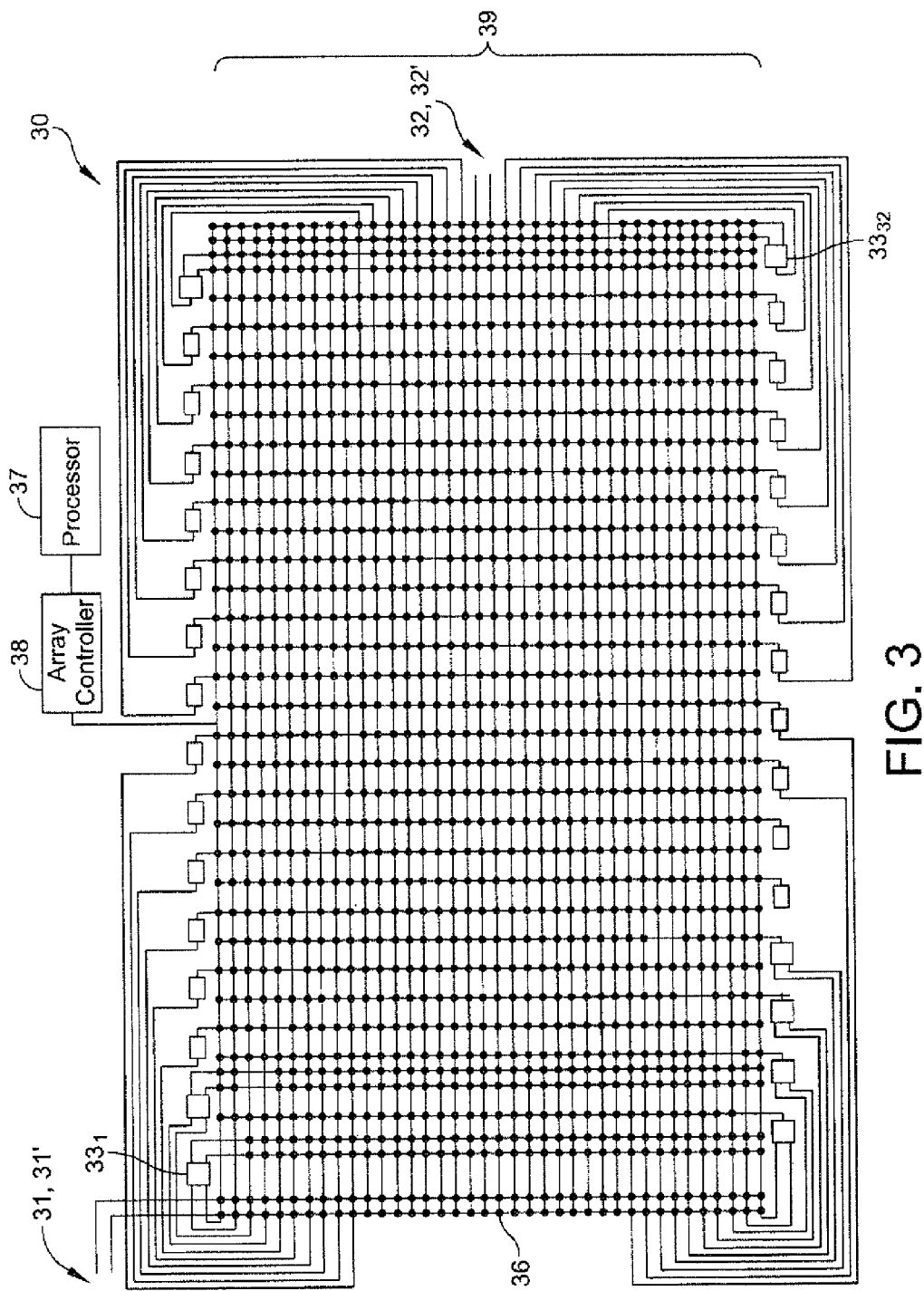
FIG. 3 is a schematic diagram of an FPMA module according to another embodiment of the present invention.

While FIG. 2 illustrates a simplified embodiment of the present invention, a more practical implementation of an FPMA module according to an embodiment of the present invention is shown in FIG. 3. Exemplary FPMA 30 comprising two input lines 31,31', two output lines 32,32', and thirty-two (32) primitive elements $33_1$-$33_{32}$ coupled via a connection matrix 39. While not labeled for the purposes of simplicity, in the exemplary embodiment, primitive elements 33 comprise two 4-port devices, six 3-port devices, two 1-port devices, and twenty-two 2-port devices. It should be understood, of course, that FPMA modules according to embodiments of the present invention may include any number or type of primitive elements depending on the application and should not be limited to the number shown herein. As set forth above with respect to FIG. 2, connection matrix 39 is designed such that it may operatively connect any primitive input to another primitive output or to the subsystem input via a plurality switches 36 comprising a switching array. Likewise, all primitive input connections are generally embodied as transverse conductors in the matrix, and output connections are connected to lateral wires. It is also noted that there are several primitives that only have single inputs (i.e., dummy loads). FPMA 30 may include an array controller 38 for selectively controlling the switch array of connection matrix 39. In the exemplary embodiment, controller 38 is responsive to control signals received from a control or system processor 37. Processor 37 may be responsive to, for example, instructions received from a remote system (e.g. from a ground-based control system for an on-orbit satellite subsystem) for processing instructions and converting them into a suitable format for array controller 38.

Embodiments of FPMA modules according to the present invention may be implemented in any suitable form. For example, FPMA modules may be built onto one or more circuit boards, formed as one of more integrated circuits or chips, or may comprise discrete components connected via a plurality of individual connection lines. In one embodiment, the FPMA module may comprise an off-the-shelf monolithic component mounted on a PC card with additional application-specific elements. For example, FPMA modules may comprise a monolithic large-scale integration (LSI) containing fifty or more primitives, an RF inter-connect switch network, a power switch system for selectively providing power to primitives, and test and status interfaces. The LSI module may be mounted on a printed circuit board (PCB) together with frequency-specific devices to form a complete custom subsystem (e.g. a receiver).

Figure 4:
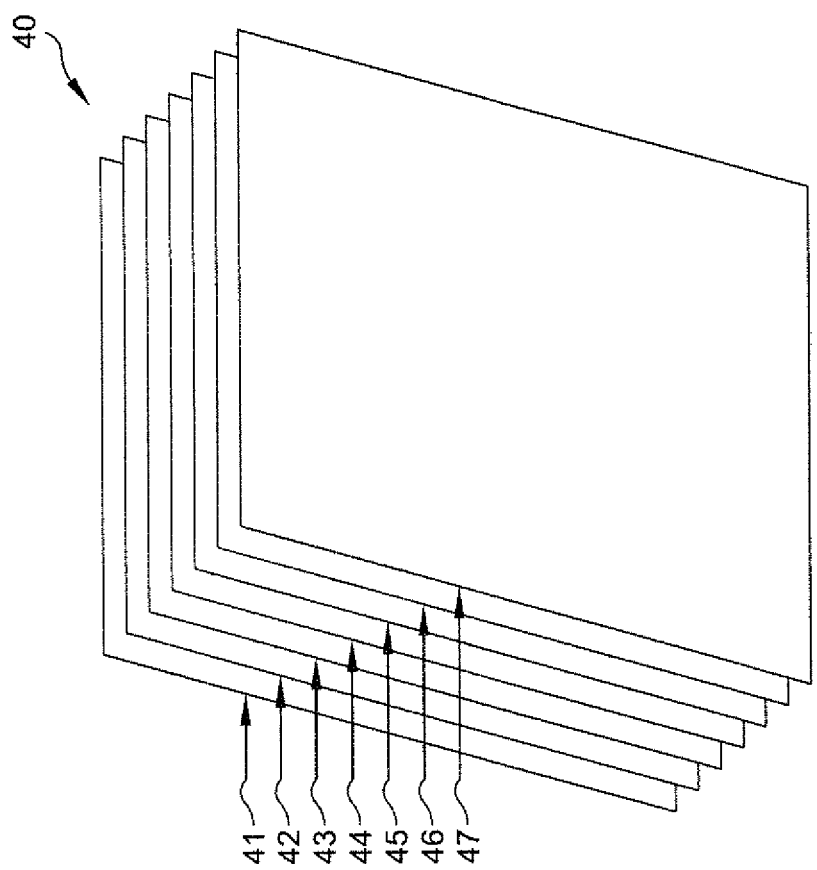
FIG. 4 is a simplified, exploded view of an exemplary layered construction of an FPMA module according to an embodiment of the present invention.

Referring generally to FIG. 4, an exemplary FPMA 40 is shown embodied as a plurality of stacked printed circuit (PC) layers 41-47. By way of non-limiting example only, primitive components may be arranged or embedded on layer 41, with power distribution provided thereto by an adjacent layer 42. Power distribution layer 42 may also comprise a second switching array for selectively providing power to primitive elements. A layer of lateral connections 43 (e.g. conductors 25 of FIG. 2) may be arranged between layer 42 and a signal switch control layer 44. An RF ground layer 45 may be provided followed by a layer of transverse connections 46 (e.g. conductors 24 of FIG. 2) followed by a switch mounting layer 47. RF ground layer 45 may be connected to a DC ground plane using an external single point connection to mitigate against ground loops. It is further envisioned that additional RF groundplanes may be implemented into the structure to provide additional protection against cross-talk interference.

Figure 5:
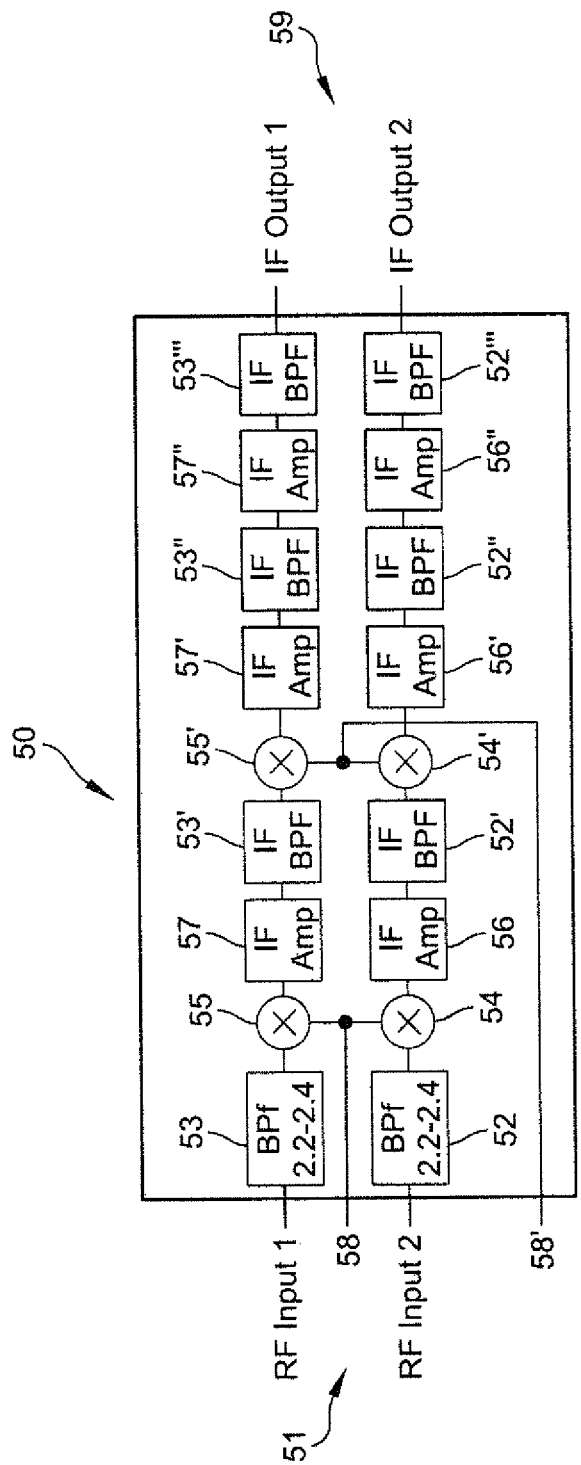
FIG. 5 is a schematic diagram of an exemplary dual channel receiver according to the prior art.
Figure 6:
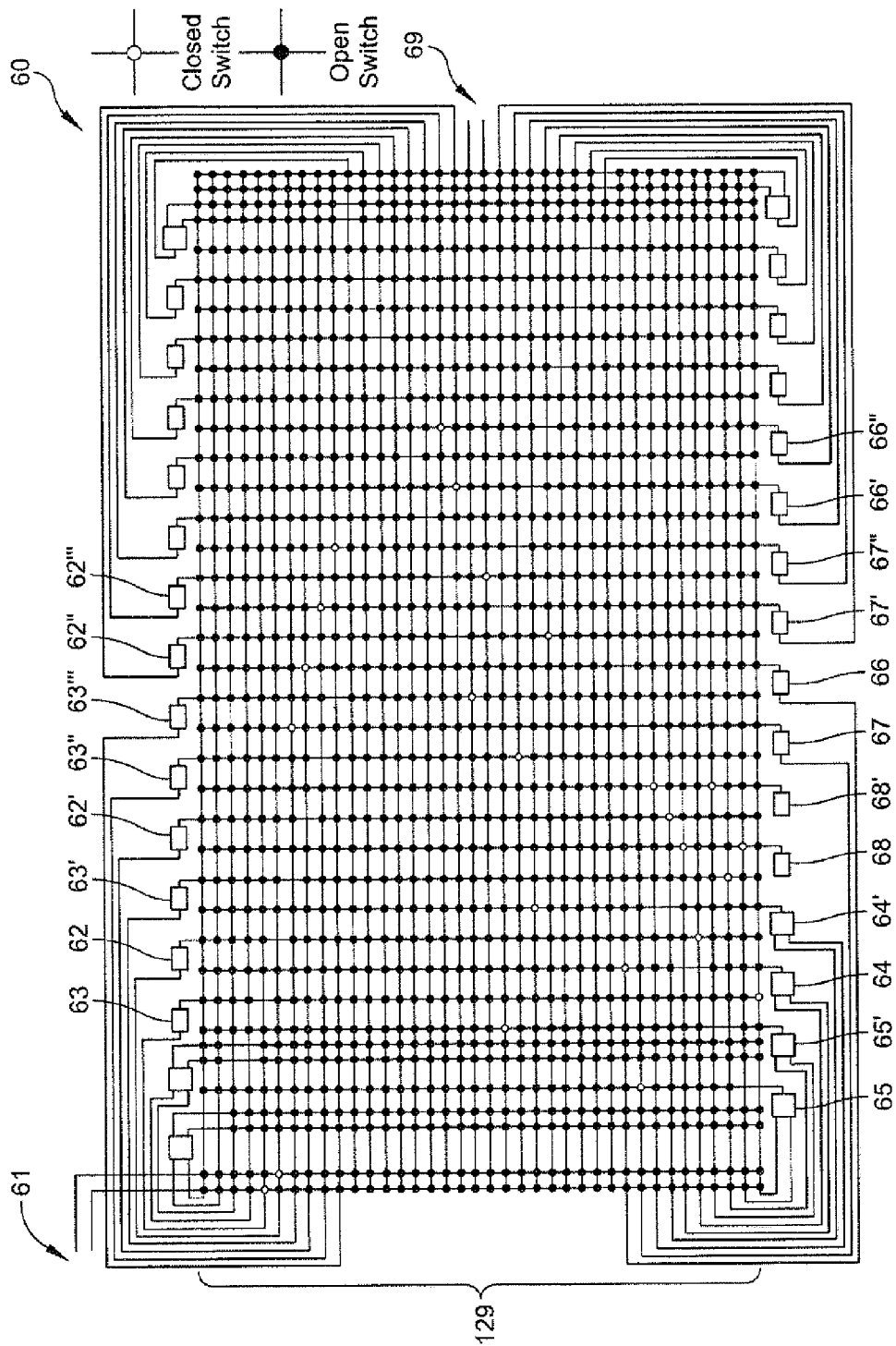
FIG. 6 is a schematic diagram of an exemplary implementation of the receiver of FIG. 5 into an FPMA module according to an embodiment of the present invention.
Figure 7:
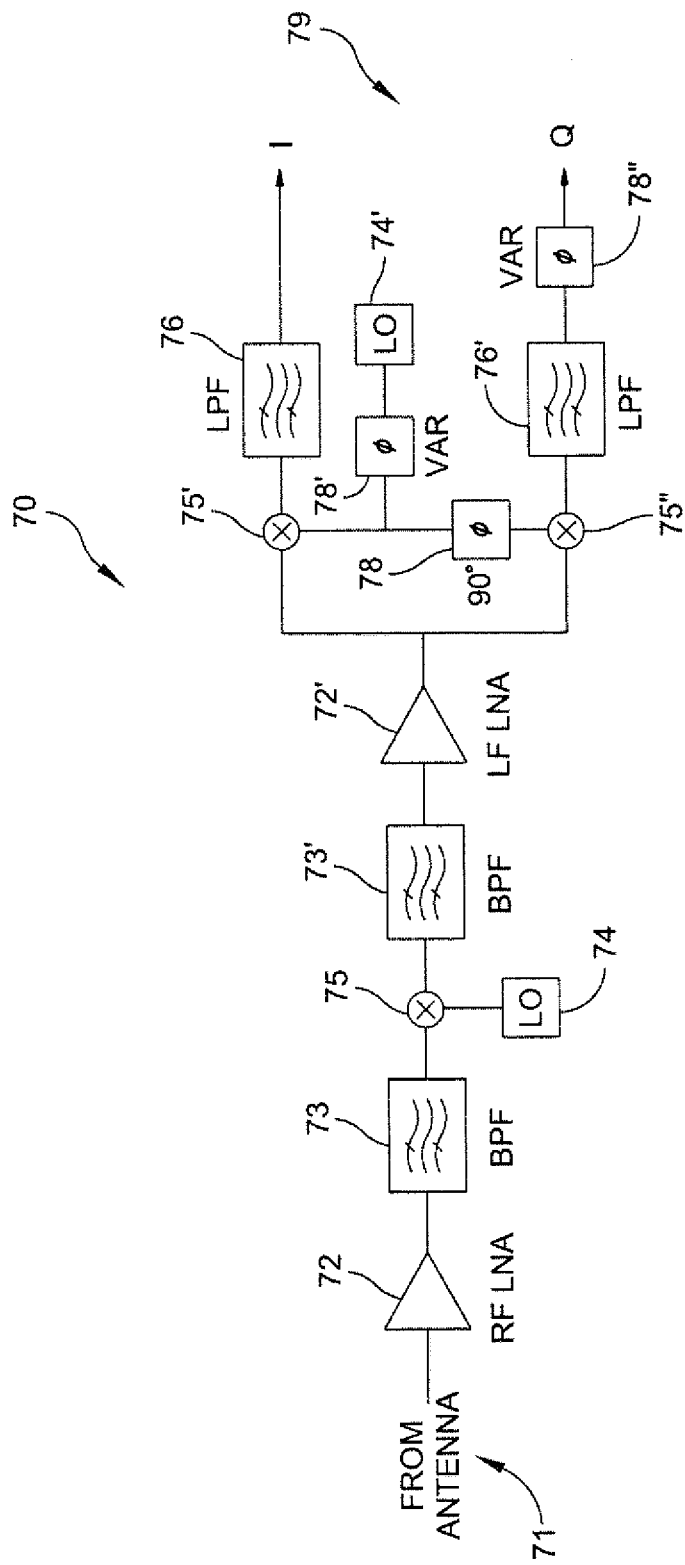
FIG. 7 is a schematic diagram of another exemplary receiver according to the prior art.
Figure 8:
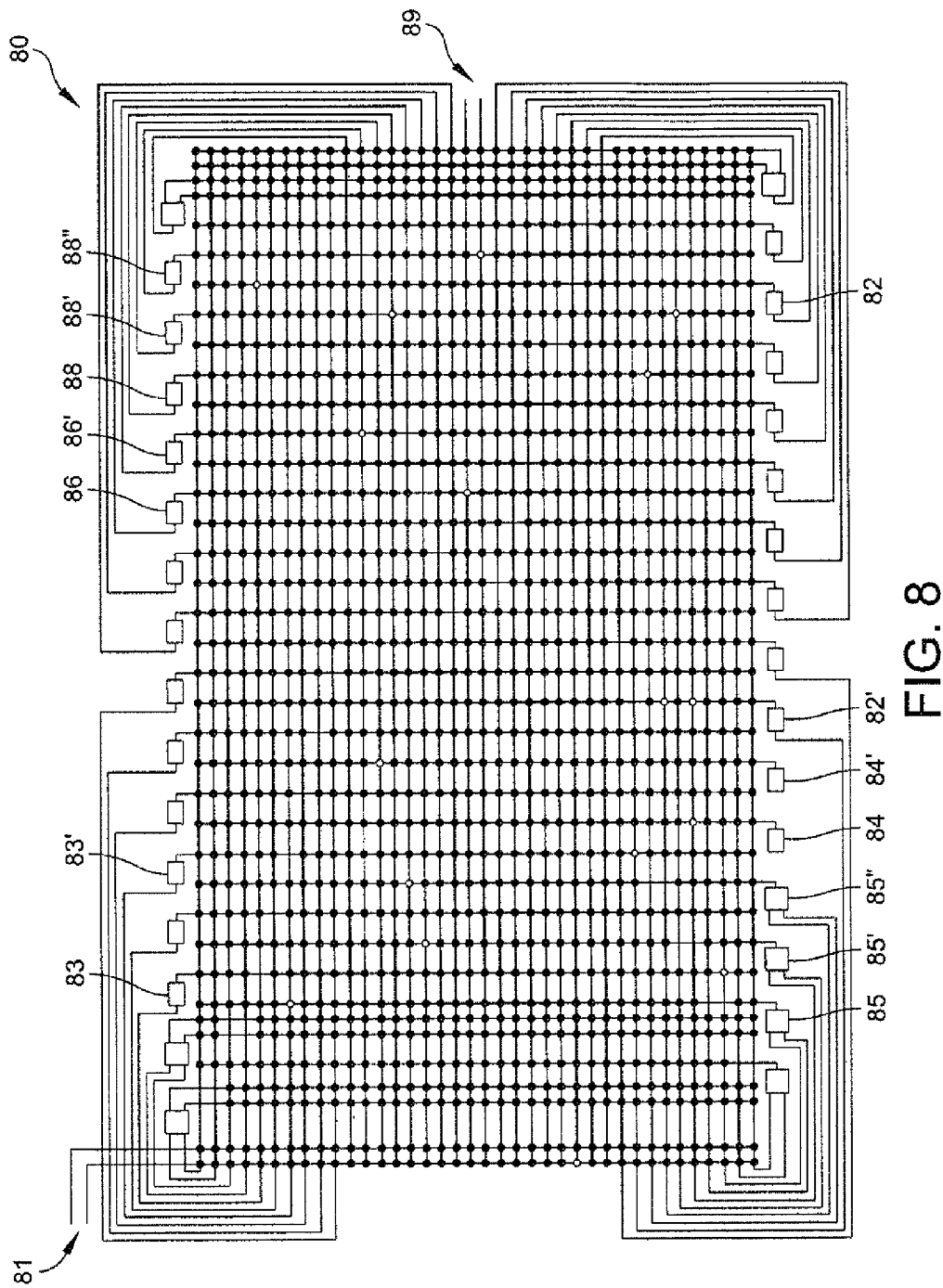
FIG. 8 is a schematic diagram of an exemplary implementation of the receiver of FIG. 7 into an FPMA module according to an embodiment of the present invention.

In application, many large subsystems (e.g. a front end module) can be parsed into smaller assemblies (e.g. a receiver) that may be compatible with FPMA size and complexity limitations. Where the general subsystem topology is linear with limited cross-connections and feedback loops, parsing to simpler assemblies may make these systems better suited to FPMA implementation. FIGS. 5 and 7 illustrate exemplary traditional radio communications subsystems and their implementation into FPMA modules as shown in FIGS. 6 and 8 according to embodiments of the present invention. Referring generally to FIG. 5, a common dual channel heterodyne receiver 50 having an input 51 and an output 59 is shown which performs two stages of downconversion: from 2.3 GHz to 350 MHz, and from 350 MHz to 15 MHz. According to embodiments of the present invention, receiver 50 comprises ten RF devices, five for each channel, including six amplifiers 56-56",57-57" and four mixers 54,54',55,55'. Receiver 50 also comprises eight band-pass filters 52-52''', 53-53''' and two local oscillators 58,58'. It should be understood that the numbers and types of devices can vary depending on the application and should not be limited to the exemplary configuration described herein.

FIG. 6 illustrates an embodiment of the dual channel receiver 50 of FIG. 5 implemented as an FPMA module. FPMA 60 takes on the general topography of those modules set forth in FIGS. 2 and 3, including inputs 61, outputs 69 and a connection matrix 129. FPMA 60 includes the same ten active RF devices, or primitives; six amplifiers 66-66",67-67" and four mixers 64,64',65,65', as well as the eight band-pass filters 62-62''',63-63''' and two local oscillators 68,68' set forth above with respect to FIG. 5. These primitives are operatively connected through connection matrix 129 which includes the same transverse and lateral connection paths and array of switching elements as set forth above with respect to FIGS. 2 and 3 for selectively connecting respective inputs and outputs of the primitives. The functionality of the arrangement of FIG. 5 is implemented into FPMA 60 by selectively opening and/or closing a number of the switching elements of connection matrix 129. These closed elements are indicated by circular highlighting. Control of the switching elements may be achieved by, for example, a controller and processor arrangement as set forth above with respect to FIG. 3. As will be set forth in greater detail below, FPMA 60 also includes several inactive primitives. These primitives may be used as cold back-ups for failure recovery, wherein selective control of connection matrix 129 allows for the rerouting of signals through these additional primitives. These additional primitives may also be used to alter the functionality of the module.

Of course, any number of input and output connections (not shown) can be added to the switch matrix to accommodate connection of additional devices as set forth above with respect to FIG. 2. For example, local oscillators 58,58' may also be implemented using primitive-based amplifiers in conjunction with a Daughter Card housing frequency-specific oscillator crystals. Likewise, one or more of the filters may also be incorporated into a Daughter Card arrangement.

FIG. 7 illustrates another exemplary subsystem, a dual-channel I-Q receiver 70, which may be implemented into an FPMA module according to embodiments of the present invention. Exemplary receiver 70 includes an input and output 71,79, two amplifiers 72,72' (an RF low-noise amplifier and an intermediate-frequency amplifier), two band pass filters 73,73', two local oscillators 74,74', three mixers 75-75", two low-pass filters 76,76' and three phase shifters 78-78".

Referring generally to FIG. 8, an FPMA 80 is provided implementing receiver 70 of FIG. 7. Module 80 includes the same two amplifiers 82,82', two band pass filters 83,83', two local oscillators 84,84', three mixers 85-85", two low-pass filters 86,86' and three phase shifters 88-88" set forth above with respect to FIG. 7. These elements are operatively connected through the connection matrix which includes the same transverse and lateral connection paths and array of switching elements as set forth above for selectively connecting respective inputs and outputs of the primitives. The functionality of the arrangement of FIG. 7 is implemented into module 80 by selectively closing a number of the switching elements of the connection matrix. It should be noted that FPMA 80 is identical to FPMA 60 of FIG. 6, however, the connection matrix being reconfigured to enable the FPMA to function as receiver 70 of FIG. 7. Thus, from a single FPMA module, multiple-configurations of varying functionality are possible.

While each element of receiver 70 is implemented as a primitive in FIG. 8, any number of changes to the arrangement may be made without departing from the scope of the present invention. For example, given that a primitive amplifier is of sufficiently-low noise, it could function as low-noise amplifier 72. However, the system may also be realized with an external amplifier (e.g. an external amplifier arranged on a Daughter Card) in conjunction with a second stage amplifier implemented as a primitive. Alternatively, an external amplifier and band-pass filter may both be implemented externally. Further still, as set forth above, it is envisioned that, for example, filters 73,73',76,76', as well as local oscillators 74,74' may be arranged on a separate Daughter Card (not shown).

The cross-point interconnections or switches (e.g. switches 27 of FIG. 2) used in embodiments of the present invention may comprise any suitable switching means including, for example, transistors or memory-resistors. In one embodiment, these switches may comprise micro-electro mechanical system (MEMS) switches arranged in a two-dimensional array. MEMS switches may be an especially advantageous choice due to their small physical dimensions and performance. For example, MEMS switches may provide in excess of 40 dB isolation and fractional dB insertion loss at 10 GHz and below, and are commercially available as single, surface mountable devices. Moreover, it is envisioned that MEMS switches may be integrated into wafer-scale integrated (WSI) circuits along with the primitive elements. For example, it is contemplated that an FPMA module may comprise a small WSI with at least fifty primitives and seven to eight thousand switches in the array. A ten-thousand element MEMS array (100×100 MEMS switches) can be constructed in a square package on the order of 10 mm×10 mm (where mm=millimeters). Of course, the number and sizes can vary depending on the application and should not be limited to the examples described herein. Moreover, it should be understood that it may not be required to populate each potential switch position (e.g. conductor crossing) with a switch in order to achieve a desired device function.

Actuation of the MEMS switches may be performed using conventional techniques. For example, MEMS switches may be constructed so as to exhibit memory. Thus, having closed a MEMS switch with a pulse applied to the "close" electrode, the switch will remain closed. The switch may be opened with a pulse applied to the "open" electrode and will remain open. In one embodiment, controlling, for example, ten-thousand MEMS switches may be performed with a two-dimensional array of 100×100 control wires, where the coincidence of pulses on a crossing pair will actuate the corresponding MEMS switch. In this manner, each member of the entire 100×100 MEMS switch array may be simply sequentially actuated (opened or closed). For initial programming, as most switches of the array are in the open position to start, pulses are sent to those switches where the closed state is desired.

It should be understood that these switch arrays may be implemented in any suitable fashion. For example, it is envisioned that MEMS switches may be embodied as integrated elements on monolithic devices. In this way, these switches may be fully-integrated into RF and control logic devices that make-up a fully developed FPMA module. Further embodiments may package the MEMS switch array and the primitives on a small multi-layer PCB (FIG. 4) that can be mass produced, tested and qualified for spacecraft application. The FPMA module also may include switching capability to provide DC power to individual active primitives. Control of this power distribution arrangement may be achieved using, for example, the same controller 38 as described above with respect to FIG. 3.

Embodiments of the FPMA modules described herein may comprise a surplus of primitives. As set forth above, these elements may be useful as cold backup spare elements in the event of failure, or for modifying subsystem functionality, without the need to physically remove or even be in the presence of the module. In the case of one or more failed primitives, embodiments of the present invention include a systematic process of hypothesizing the failure mode and testing the hypothesis by element substitution. This process may be performed iteratively until full functionality is restored.

Figure 9:
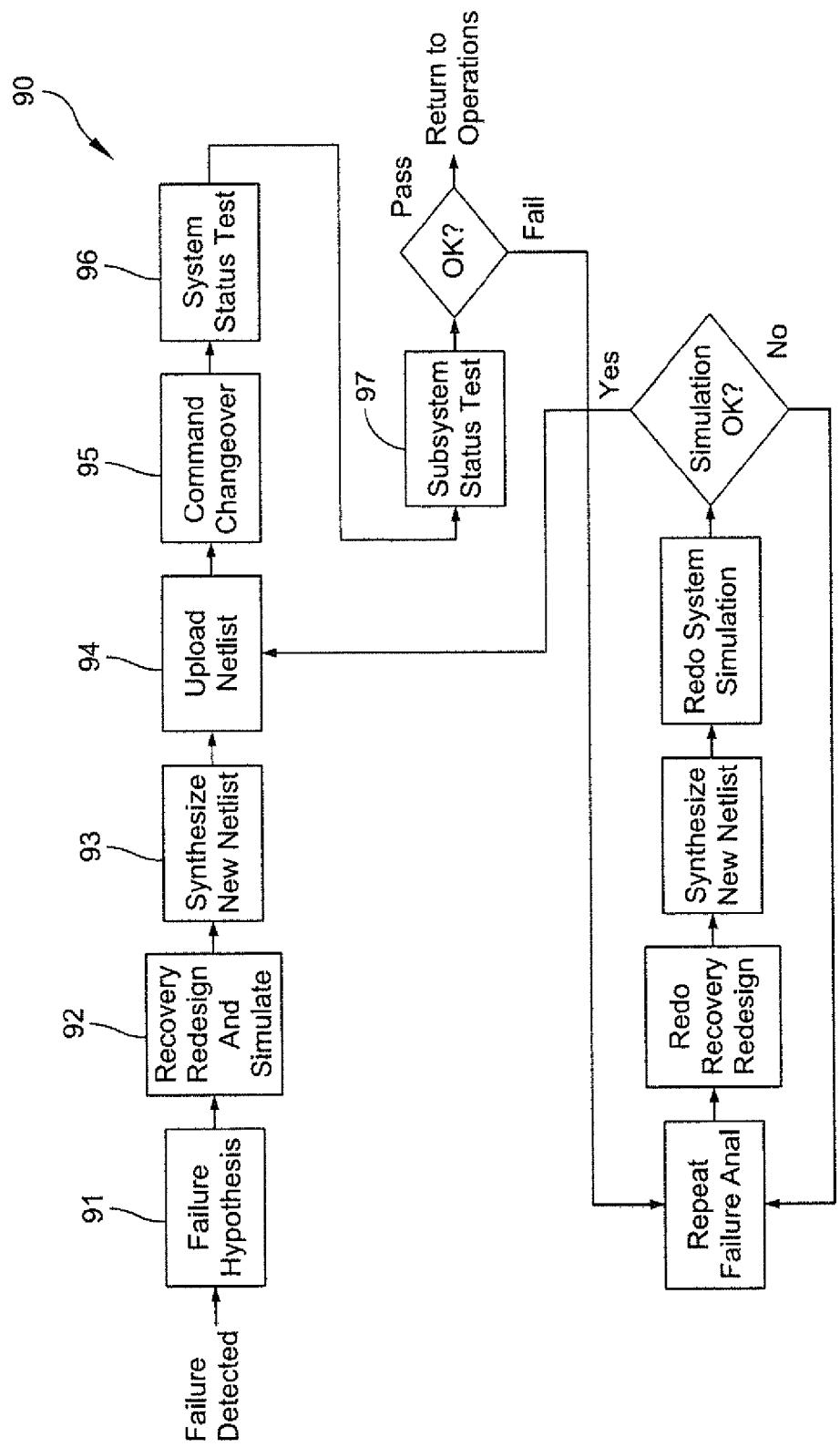
FIG. 9 is a process flow diagram illustrating an exemplary FPMA failure recovery process according to an embodiment of the present invention.

A method for failure recovery according to one embodiment is shown in the process flow depicted in FIG. 9. A failure recovery process 90 may be implemented to identify the source of a detected system failure, as well as restore system functionality. For example, a control processor or system (e.g. processor 37 of FIG. 3) may be configured to detect a subsystem failure (e.g. no signal output from an FPMA module). Once a failure is detected, the system may generate a failure hypothesis in step 91 which attempts to identify a likely source of failure. Thus, an exemplary system may be preprogrammed with a plurality of anticipated failure modes. One of these failure modes may then be selected by the system as the hypothesis based on any number of factors including, for example, the likelihood of failure of a given component, or the type and/or characteristics of the detected failure. In step 92, based on the selected hypothesis, the system may generate a hypothetical redesign of the module. A redesign may consist of, for example, identifying inactive primitives in the module which may be used in place of a hypothesized failed primitive, as well as a corresponding connection matrix configuration which connects the inactive primitive in the correct sequence, while bypassing the hypothetical failed primitive. The functionality of this redesign may be simulated to ensure proper operation. If the simulation is successful, a corresponding netlist, or switch array map, may be generated in step 93 and uploaded to a switching array controller or processor in step 94 (e.g. controller 38 of FIG. 3). In step 95, a changeover is implemented, wherein the switching array is altered according to the updated netlist. System and subsystem status checks may be performed in steps 96 and 97, and a determination made as to the success of the repair. If the repair is successful, normal operations may be continued. However, if the test is unsuccessful, the failure analysis process may begin again, with the generation of a new failure hypothesis. Of course, additional steps can be incorporated into the process according embodiments of the present invention, or one or more steps may be removed.

While the steps of the failure recovery process of FIG. 9 have been described as implemented by a control system, it should be understood that any or all of the steps may be performed by, for example, an operator, or by a separate, remotely-located control system, without departing from the scope of the present invention.

Referring generally to FIGS. 10a-13b, an exemplary failure recovery process is shown and described in context of the dual channel receiver of FIG. 6. More specifically, FIGS. 10a, 11a, 12a and 13a are process flow diagrams illustrating the steps of an exemplary failure recovery process according to an embodiment of the present invention, while FIGS. 10b, 11b, 12b and 13b show FPMA 60 of FIG. 6 during the failure recovery process. Referring generally to FIGS. 10a-10b, an exemplary process includes recognizing the presence and/or absence of an output signal from FPMA 60 in step 100. If an acceptable signal is detected, operations of the receiver continue as normal (step 101). However, referring generally to FIGS. 11a-11b, if no signal is detected at the output of FPMA 60, or a signal is detected that is deemed to be faulty, the process proceeds to step 102, wherein a failure hypothesis is generated. In the exemplary process, the failure hypothesis identifies a potential failure of amplifier 67" (57" of FIG. 5).

Figures 12A, 12B:
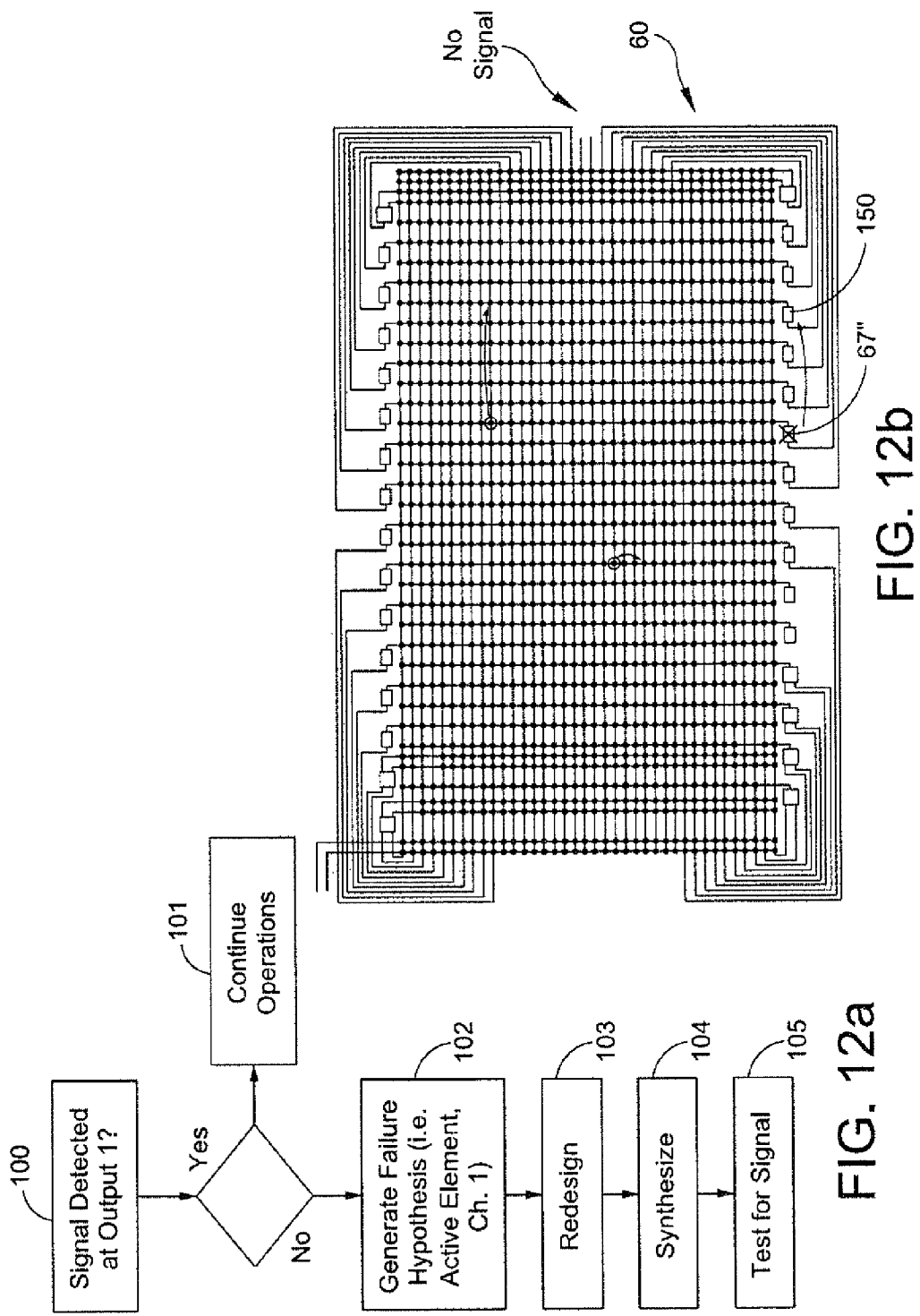

As shown in FIGs. 12a-12b, step 103 includes generating a redesigned FPMA arrangement in an attempt to repair the system. Referring generally to FIG. 12b, this redesign includes bypassing the hypothetical failed amplifier 67", and introducing a previously-inactive amplifier 150 in place thereof. This is achieved by (hypothetically) altering the switching array as shown, operatively connecting the input and output of amplifier 150 to the system, while disconnecting the input and output of amplifier 67". Step 104 of the process includes synthesizing this hypothetically redesigned FPMA. If the synthesized FPMA performs as expected, the netlist, or updated switching array map, is uploaded and implemented into FPMA 60. Step 105 of the process includes testing for a signal output after the redesign has been implemented into the FPMA.

Referring generally to FIGS. 13a-13b, if an acceptable output signal is detected, the process proceeds to step 101, and normal operations are continued. However, if no signal, or an unacceptable signal, is detected the process proceeds to step 106, wherein the failure hypothesis/system redesign process may be repeated. In the exemplary embodiment, a failure of the first redesign may result in the generation of a second failure hypothesis, wherein amplifier 67' (57' of FIG. 5) is identified as a hypothetical failure, and the switching array is altered to place amplifier 67" back into active operation, while deactivating amplifier 67' and replacing it with amplifier 150. This process may be repeated until proper functionality of the FPMA module is restored.

Figure 14:
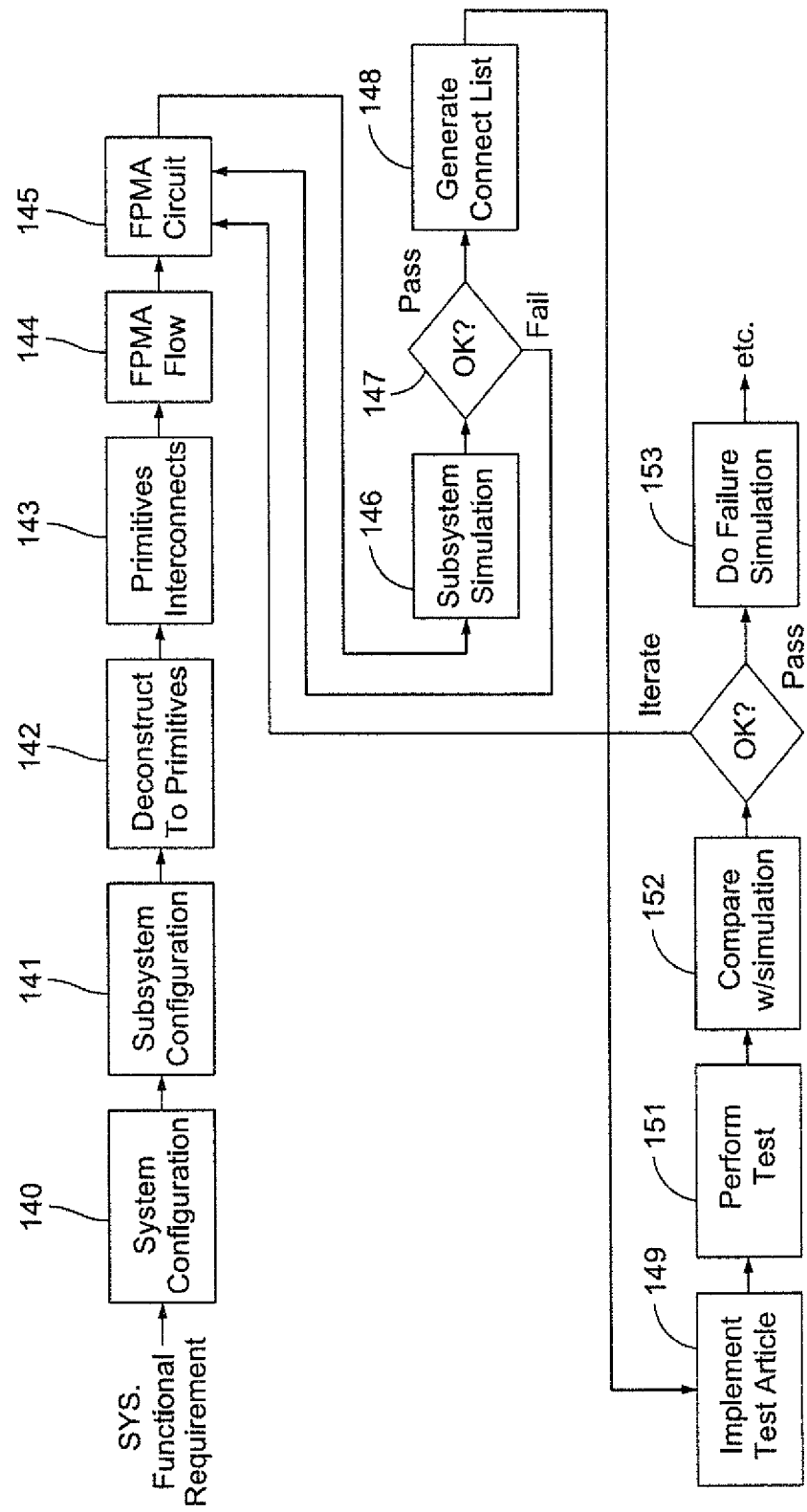
FIG. 14 is a process flow diagram illustrating an exemplary design process of an FPMA according to embodiments of the present invention.

While FPMA modules according to embodiments of the present invention may be designed and implemented in any suitable manner, FIG. 14 generally illustrates an exemplary design process useful for creating the FPMA modules described herein. Referring generally to steps 140 and 141, once the functional requirements of a subsystem targeted for FPMA implementation have been identified, a designer may configure both an overall system (e.g. a front end module) and FPMA-based subsystems (e.g. a receiver) for performing the identified functionality. These configured systems may be deconstructed, identifying the number and types of primitive elements (or external elements) required for operation in step 142. Referring generally to step 143, once these primitives are identified, a connection matrix may be generated for operatively connecting each of the identified primitive elements. It should be understood that any number of additional design considerations may be required for successful device implementation into FPMA form. For example, it is envisioned that connection system issues related to operating frequencies and delay matching may exist. Where time delay and phase delay matching are desirable, a designer may place paired primitive inputs on adjacent lateral traces, while pairing primitive outputs on adjacent transverse traces, and placing balun outputs to adjacent lateral or transverse pairs for phase matching. Ground connections to the ground plane may be made with a via for improved isolation.

Once a desired input and output flow is determined in step 144, a switching array map, or netlist, may be generated in step 145 which provides the desired interconnection between primitives. This array map or circuit may be simulated in step 146 and tested in step 147 for intended performance. If the map achieves the desired system functionality, in step 148, the map may be used to generate a connection list, or a list of each switching element, and the state (open or closed) of each element that is required to achieve an intended device function. Once the physical FPMA module is constructed in step 149, it may be updated with the generated connection list, and tested against the results of the previous simulation in steps 151 and 152. Referring generally to step 153, once operation is verified, additional simulations may be carried out to generate various failure modes. The results of these simulations may be used to, for example, program a control system with a list of failure hypotheses and repair instructions for performing the above-described system recovery operations.

As set forth above, successfully designing FPMA modules according to embodiments of the present invention may depend on the ability to create an accurate simulation model of the un-programmed device that could be specialized for the desired function. Accordingly, a modeling system, such as SIMUL1NK© which runs on a MATLab© system may be implemented for generating these simulations in a similar manner as that set forth above with respect to FIG. 14. Specifically, a designer may assign primitives to specific elements of the subsystem recognizing that the choice of primitives also includes the choice of parasitic reactances and element cross-coupling. Once the assignments are initially made, the CAD software may then construct the netlist for the connection matrix. The CAD system may then download the subsystem to the simulation platform where the simulation is performed including the parasitics and couplings. The overall performance is compared with the performance requirements. In the simulation process, the assignments of FPMA primitives to circuit elements of the subsystem are iterated. The simulations and design iterations continue until a desired design is achieved. When the modifications result in simulated performance in accordance with the subsystem requirements, the netlist is downloaded to the physical FPMA module for validation testing. Test results are compared with the simulation results. Where close agreement is achieved, the FPMA subsystem as well as the simulation thereof are validated. The same CAD and simulation software may also be used to simulate and emulate various failure modes for validating the performance of failure recovery processes.

Through the above-described processes, it is envisioned that a working model of a subsystem may be physically realized in a matter of days, compared to current discrete component circuits requiring months of development with concomitant scheduling and cost. Where the FPMA modules are space qualified, they may be flown as parts of the RF payload of aircrafts or spacecrafts, reducing the developmental and manufacturing schedule and cost.

While exemplary processes are shown and described, it should be understood that other embodiments for implementing the failure recovery or module reconfiguration processes described herein may be contemplated by one of skill in the pertinent art without departing from the intended scope of this disclosure. For example, the processes have been explained by way of example, to include memory containing instructions, the instructions when executed by a processor, cause the steps of the processes to be performed. It is understood that the processes may also be performed in hardware, for example in a field programmable gate array (FPGA) or a complex programmable logic device (CPLD). Thus, the whole process or any part thereof, may be performed in hardware, software or any combination of hardware and/or software. Software may be embodied in a non-transitory machine readable medium upon which software instructions may be stored, the stored instructions when executed by a processor cause the processor to perform the described process steps. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A field programmable microwave array (FPMA), comprising:
   a plurality of microwave or radio-frequency circuit elements;
   a connection matrix comprising a plurality of conductors and a plurality of switching elements for selectively routing input signals to the circuit elements and output signals from the circuit elements, wherein the connection matrix and the switching elements are configured in the FPMA to enable the FPMA to perform one or more predetermined functions; and
   a processor configured to:
      detect a failure associated with a function of the FPMA; and
      reconfigure the connection matrix to restore the function of the FPMA.

2. The FPMA of claim 1, wherein the plurality of conductors comprises a first group of conductors operatively connected to the inputs of the plurality of circuit elements, and a second group of conductors operatively connected to the output of the plurality of circuit elements.

3. The FPMA of claim 2, wherein conductors of the first group of conductors overlaps with conductors of the second group of conductors.

4. The FPMA of claim 3, wherein the plurality of switching elements are arranged at overlapping points of the conductors of the first and second groups.

5. The FPMA of claim 2, wherein the plurality switching elements are operative to selectively connect each of the conductors of the first group with any of the conductors of the second group.

6. The FPMA of claim 1, wherein the connection matrix is reconfigurable such that the plurality of circuit elements may be selectively interconnected in a plurality of arrangements having distinct functions.

7. The FPMA of claim 1, further comprising a second processor for selectively controlling the plurality of switches.

8. The FPMA of claim 1, wherein the plurality of switching elements comprise micro-electro mechanical system (MEMS) switches.

9. The FPMA of claim 1, wherein the FPMA is embodied as a multi-layered printed circuit board.

10. The FPMA of claim 1, wherein the FPMA is configured to function as a radio-frequency receiver.

11. The FPMA of claim 1, wherein the processor is further configured to:
   generate a failure hypothesis which attempts to identify a source of the detected failure;
   generate a hypothetical reconfiguration of the connection matrix for restoring the function of the FPMA;
   simulate the hypothetical reconfiguration; and
   reconfigure the connection matrix according to the hypothetical reconfiguration if the simulation is shown to successfully restore the function of the FPMA.

12. The FPMA of claim 11, wherein the processor is further configured to repeat the steps of generating a failure hypothesis, generating a hypothetical reconfiguration, and simulating the hypothetical reconfiguration until a successful simulation is achieved.

13. The FPMA of claim 11, wherein the processor is further configured to test the functionality of the FPMA after the connection matrix has been reconfigured according to the hypothetical reconfiguration.

14. The FPMA of claim 11, wherein the processor is further configured to identify at least one inactive circuit element which may be used in place of at least one hypothesized failed circuit element.

15. The FPMA of claim 11, further comprising a memory device containing a number of predetermined failure hypotheses stored thereon, wherein the processor is responsive to the memory device for generating the failure hypothesis according to one or more of the predetermined failure hypotheses.

16. A field programmable microwave array (FPMA), comprising:
   a plurality of microwave or radio-frequency circuit elements; and
   a connection matrix comprising a plurality of conductors and a plurality of switching elements for selectively routing input signals to the circuit elements and output signals from the circuit elements,
   wherein the connection matrix and the switching elements are configured in the FPMA to enable the FPMA to perform one or more predetermined functions, and
   wherein the connection matrix further comprises at least one input/output port for operatively connecting additional external microwave or radio-frequency elements to the connection matrix.

17. A method of constructing a radio-frequency or microwave device comprising:
   providing a plurality of circuit elements;
   connecting the plurality of circuit elements to a connection matrix, the connection matrix comprising a plurality of switches for selectively connecting the output of one or more circuit elements to the input of one or more other circuit elements;
   programming the device by selectively-activating one or more of the plurality of switches to configure the device in order to achieve a first predetermined device function;
   detecting a failure associated with a function of the device; and
   reconfiguring the connection matrix to restore the function of the device.

18. The method of claim 17, wherein the connection matrix further comprises a plurality of conductors.

19. The method of claim 18, wherein the step of connecting the plurality of conductors comprises connecting a first group of conductors to the inputs of the plurality of circuit elements, and connecting a second group of conductors to the output of the plurality of circuit elements.

20. The method of claim 19, wherein conductors of the first group of conductors overlap with conductors of the second group of conductors and wherein the plurality of switching elements are arranged at the overlapping points of the conductors of the first and second groups.

21. The method of claim 17, further comprising the step of reprogramming the device by selectively-activating one or more of the plurality of switches to configure the device in order to achieve the first predetermined device function by at least bypassing at least one of the previously connected circuit elements.

22. The method of claim 17, further comprising the step of reprogramming the device by selectively-activating one or more of the plurality of switches to configure the device in order to achieve a second predetermined device function different from the first predetermined function by connecting the output of one or more circuit elements to the input of one or more other circuit elements.

23. The method of claim 17, wherein the first predetermined function is one of a transmitter.

24. The method of claim 17, wherein the first predetermined function is one of a receiver.

25. The method of claim 17, wherein the plurality of switches comprise a plurality of micro-electro mechanical system (MEMS) switches.

* * * * *